United States Patent
Lewis et al.

(10) Patent No.: US 8,066,056 B2
(45) Date of Patent: Nov. 29, 2011

(54) HEAT EXCHANGE SYSTEM FOR PLUME ABATEMENT

(75) Inventors: Larry Lewis, Houston, TX (US); Jeff Diaz, Houston, TX (US)

(73) Assignee: SME Products, LP, Houston, TX (US)

( * ) Notice: Subject to any disclaimer, the term of this patent is extended or adjusted under 35 U.S.C. 154(b) by 1097 days.

(21) Appl. No.: 10/853,787

(22) Filed: May 26, 2004

(65) Prior Publication Data

US 2005/0263262 A1 Dec. 1, 2005

(51) Int. Cl.
*F25B 29/00* (2006.01)
(52) U.S. Cl. .................. 165/61; 165/47; 165/901; 122/5
(58) Field of Classification Search ............ 165/61, 165/166, 900, 901, 47, 140; 122/5
See application file for complete search history.

(56) References Cited

U.S. PATENT DOCUMENTS

| | | | |
|---|---|---|---|
| 1,899,629 A | 2/1933 | Morse | |
| 2,475,025 A * | 7/1949 | Huff | 165/140 |
| 2,521,462 A * | 9/1950 | Kinzelmann | 165/901 |
| 2,633,338 A | 3/1953 | Hiersch | |
| 2,735,660 A | 2/1956 | Craig | |
| 2,764,391 A * | 9/1956 | Pullen | 165/901 |
| 3,277,958 A | 10/1966 | Taylor et al. | |
| 3,294,161 A | 12/1966 | Wood | |
| 3,818,869 A * | 6/1974 | Blaskowski | 122/5 |
| 3,995,689 A * | 12/1976 | Cates | 165/166 |
| 4,029,146 A * | 6/1977 | Hart et al. | 165/166 |
| 4,103,735 A * | 8/1978 | Warner | 165/901 |
| 4,106,474 A * | 8/1978 | Hunter et al. | 165/901 |
| 4,119,140 A * | 10/1978 | Cates | 165/166 |
| 4,158,438 A | 6/1979 | Hapgood | |
| 4,344,482 A | 8/1982 | Dietzsch | |
| 4,503,902 A * | 3/1985 | Zolik | 165/901 |
| 4,546,818 A | 10/1985 | Nussbaum | |
| 4,705,101 A * | 11/1987 | Warner | 165/909 |
| 4,739,826 A * | 4/1988 | Michelfelder et al. | 165/901 |
| 4,781,241 A | 11/1988 | Misage et al. | |
| 4,930,571 A * | 6/1990 | Paull | 165/901 |
| 5,323,603 A | 6/1994 | Malohn | |
| 5,325,915 A | 7/1994 | Founts et al. | |
| 5,394,860 A * | 3/1995 | Borle | 165/901 |
| 5,419,392 A | 5/1995 | Maruyama | |
| 5,820,830 A * | 10/1998 | McIlroy et al. | 422/168 |
| 5,855,111 A | 1/1999 | Oguchi et al. | |
| 5,944,090 A * | 8/1999 | Teal | 165/47 |
| 5,944,094 A * | 8/1999 | Kinney et al. | 165/166 |
| 6,247,682 B1 * | 6/2001 | Vouche | 165/900 |
| 6,663,694 B2 * | 12/2003 | Hubbard et al. | 165/166 |
| 6,667,011 B1 | 12/2003 | Munje et al. | |
| 6,880,628 B2 | 4/2005 | Yoshida et al. | |
| 7,056,367 B2 * | 6/2006 | Trivett | 95/226 |
| 7,117,934 B2 | 10/2006 | Lomax, Jr. et al. | |
| 7,237,602 B2 | 7/2007 | Arai et al. | |
| 2002/0038702 A1 | 4/2002 | Font-Freide et al. | |
| 2002/0124996 A1 | 9/2002 | Jukkola et al. | |
| 2003/0173062 A1 | 9/2003 | Lomax, Jr. et al. | |
| 2005/0092472 A1 | 5/2005 | Lewis | |

FOREIGN PATENT DOCUMENTS

| | | |
|---|---|---|
| DE | 3218710 | 7/1983 |
| EP | 0 326 388 | 8/1989 |
| JP | 9144565 | 6/1997 |

* cited by examiner

*Primary Examiner* — Ljiljana Ciric
(74) *Attorney, Agent, or Firm* — Patterson & Sheridan, LLP

(57) ABSTRACT

A heat exchange method and system for heat transfer includes a plate fin and tube or finned tube heat exchanger that reduces the plume of a stream that is being rejected to atmosphere by reducing the water dew point of the stream.

13 Claims, 2 Drawing Sheets

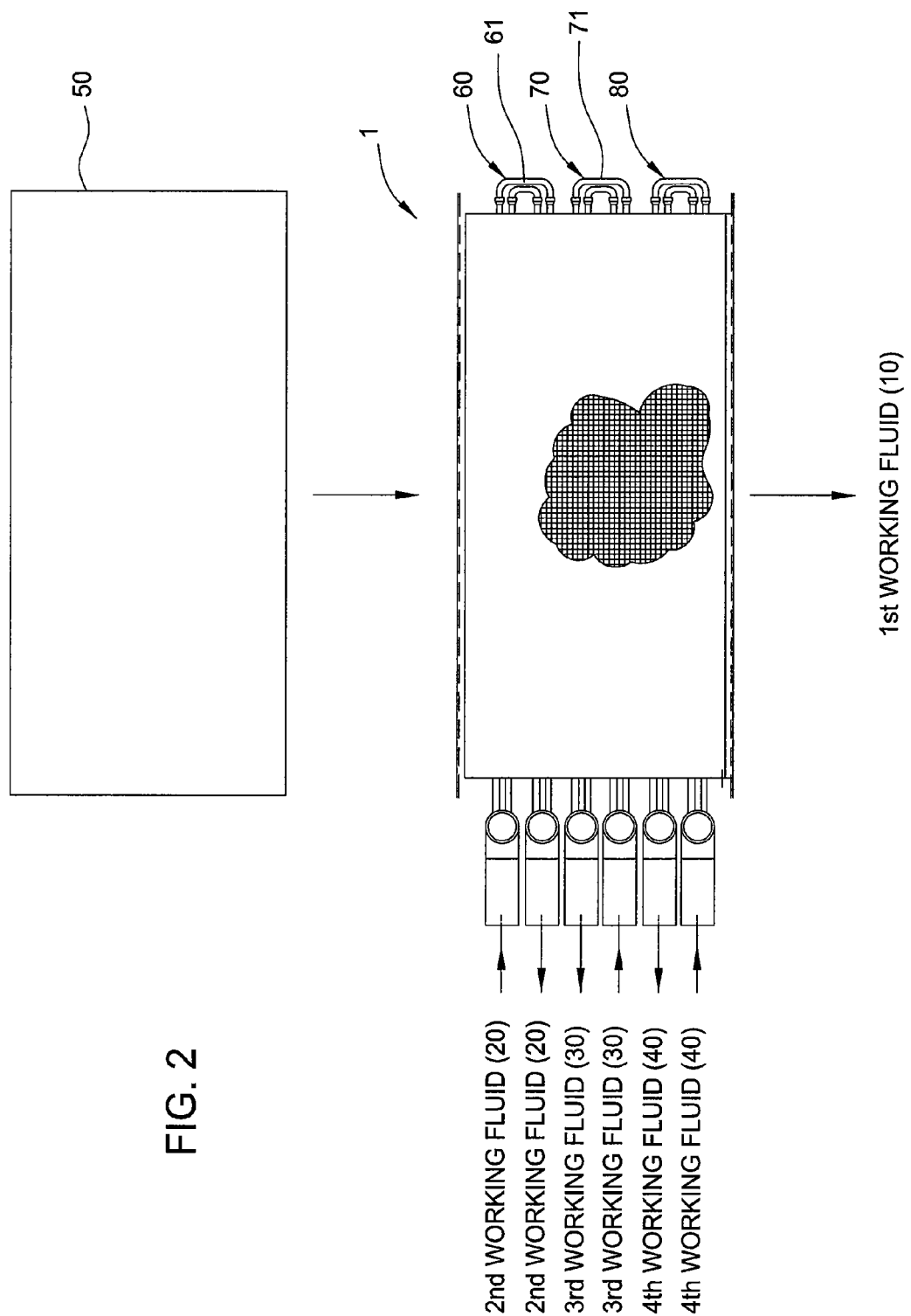

HEAT EXCHANGE SYSTEM FOR PLUME ABATEMENT

TECHNICAL FIELD

This invention pertains to the field of heat exchange and specifically to a more efficient design of heat exchangers for plume and emissions control from a wet gas scrubber or similar device.

BACKGROUND OF THE INVENTION

Plate fin and tube heat exchangers or externally finned tube exchangers have long been employed to recover process heat. These exchangers are most often employed to heat or cool a low density gas stream located on the finned side against a denser fluid with higher heat transfer coefficient within the tubes. The extended surface on the finned exterior pass allows greater heat transfer surface than a bare tube and provides greater heat transfer at a low-pressure drop.

The art has not heretofore recognized the unexpected advantage of using multiple cooling streams on the tube side of one or more heat exchanger and interlacing the heat transfer zones to allow more effective heat transfer and reduce the water dewpoint of the stream to reduce or eliminate visible vapor plume while also reducing SO3 emissions was not recognized in the art.

SUMMARY OF THE INVENTION

The invention may be described in several ways as alternate embodiments of the same novel discovery.

Embodiments of the present invention provide a finned tube exchanger that can be used in a heat transfer system.

In one embodiment, a method of heat transfer using a heat transfer device includes:

a. providing a first working fluid which has a water dewpoint above ambient air temperature on the finned exterior side of the heat transfer device, b. providing 2 or more working fluids flowing in separate circuits within the tube circuits of the heat transfer device, c. feeding the first working fluid to the exterior finned side of a heat transfer zone or zones to transfer heat to or from the first working fluid thereby heating or cooling the first working fluid to a higher or lower temperature, d. feeding the second working fluid into a tube or group of tubes to be heated or cooled by the first working fluid, and e. feeding the third or more working fluid(s) into a tube or group of tubes to be heated or cooled by the first working fluid.

In a preferred embodiment of the invention, a method of heat transfer includes providing a heat exchange device having one or more finned exterior side working fluid streams against multiple tube side circuits, wherein the multiple tube circuits being interlaced to more effectively approach the cooling curve of the finned exterior side working fluid, and cooling the high dewpoint working fluid on the exterior finned surface of the exchanger to reduce the water content of the exhaust stream.

In another embodiment, a method of heat transfer using a circuitry of a plate fin and tube or finned tube exchanger that allows for more effective heat transfer includes recovering heat from the effluent stream with a first cooling stream, using a second working fluid as a cooling stream to further remove heat from the effluent stream, then circuiting and pumping the first cooling stream which has been heated by the effluent stream in the finned tube exchanger to heat the effluent stream above its dew point.

A construction and design of a heat transfer system allowing complex circuitry of a plate finned and tube or finned tube exchanger utilizing multiple tube side circuits that accomplish more effective heat transfer while reducing the heat rejection load on cooling towers or other heat removal devices while simultaneously reducing the energy input required to heat the exhaust stream above it's dew point for plume suppression.

In summary, the invention provides a system for more efficient heat transfer in a plate fin and tube or finned tube exchanger to reduce the plume of a stream that is being rejected to atmosphere that has a water dew point above that of the ambient air.

The invention is illustrated by the specific example set out below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a sketch of an integrated coil having an exhaust stream on the finned side and cooling and heating circuitry on the tube side.

DETAILED DESCRIPTION OF THE INVENTION

Figure 1:
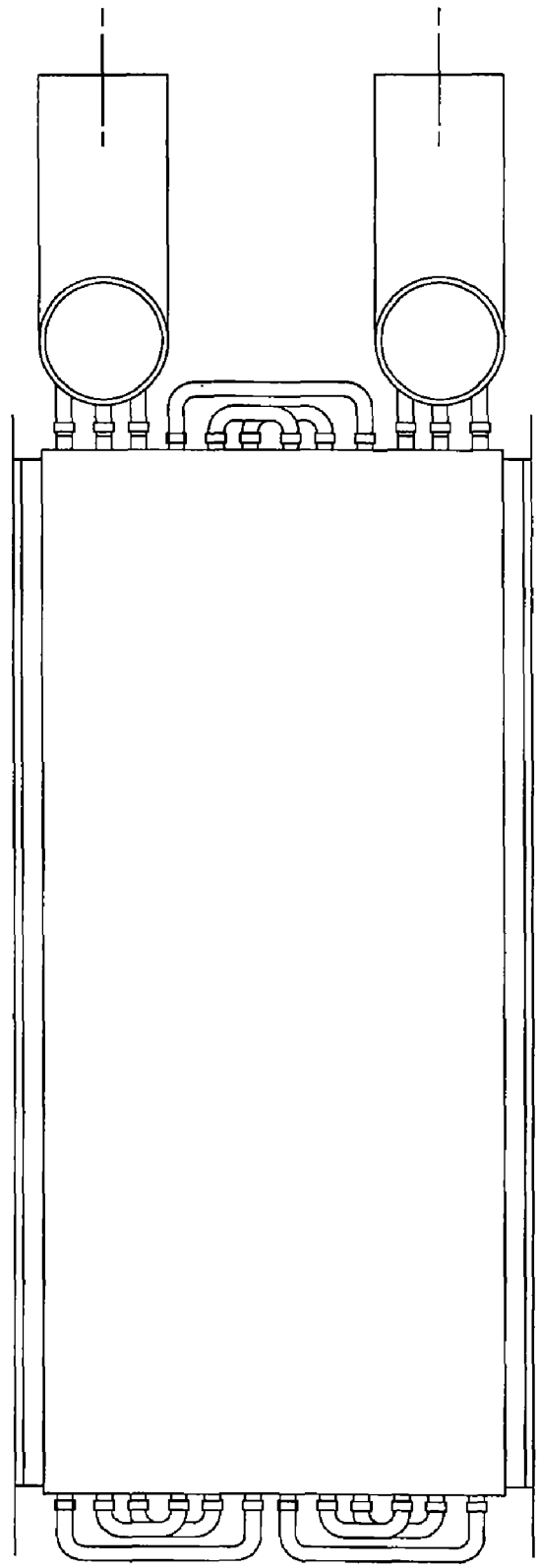
FIG. 1 is a sketch of a typical finned tube coil having two working fluids.

The invention provides a method of integrating circuitry with various working fluids in a common or multiple plate fin and tube or finned tube exchanger(s) to accomplish more efficient heat transfer and reduce the plume of a stream that is being rejected to atmosphere that has a water dew point above that of the ambient air. This example is provided to illustrate the invention and not to limit the concepts embodied therein. The invention is defined and limited by the claims set out below. The examples below were modeled using a commercial process simulator.

Example 1

Turning to FIG. 2, a first working fluid (10), generated from a device 50, such as a wet gas scrubber, enters the heat exchanger 1 at 150 F, 14.8 psia, 11,430 moles/hr and leaves the heat exchanger 1 at 140 F, 14.7 psia. It exchanges heat with a $2^{nd}$ working fluid (20) which is water entering at 130 F, 80 psia, 9,800 moles/hr and leaving at 145 F, 70 psia. The first working fluid (10) also exchanges heat with a $3^{rd}$ working fluid (30) which is water entering at 85 F, 39.7 psia, 81,750 moles/hr and leaving at 115 F, 24.7 psia. The first working fluid (10) also exchanges heat with the previously heated $2^{nd}$ working fluid, labeled as a fourth working fluid (40) in FIG. 2, which is water and was heated in the first exchanger 60 pass entering at 145 F, 70 psia, 176,500 moles/hr and leaving at 130 F, 60 psia. 40,680 lb/hr of the water contained in the first working fluid (10) is condensed in the first exchanger 60 and the second exchanger 70 and removed, thereby lowering the dewpoint; then the first working fluid (10) is heated in the third exchanger 80 and is discharged to atmosphere, resulting in less visible plume.

In one embodiment, a method of recovering energy and visible plume abatement includes providing a finned tube heat exchanger having a finned exterior side; providing a first working fluid that has a dew point greater than the ambient air; feeding the first working fluid to the exterior finned side of a heat transfer zone to cool the first working fluid and thereby heating the second working fluid to a higher temperature; feeding the second working fluid into a tube, group of tubes, or passageways, e.g., item (61) shown in FIG. 2, to be heated or cooled by the first working fluid; feeding a third working fluid into a tube, group of tubes, or pasageways, e.g., item (71) shown in FIG. 2, to be heated by the first working fluid and thereby cooling the first working fluid; routing the second working fluid from the first exchanger to a third exchanger or group of exchangers to heat the first working fluid, wherein the cooling of the first working fluid condenses water which is removed by separation, then the first working fluid is heated to well above its dewpoint which reduces or eliminates visible plume before being discharged to atmosphere.

In another embodiment, a circuitry of a plate fin and tube or finned tube exchanger that allows for more effective heat transfer is provided.

In yet another embodiment, a construction and design of a heat transfer system allowing complex circuitry of a plate finned and tube or finned tube heat exchanger utilizing multiple tube side circuits within a common heat transfer device or group of heat exchangers.

In yet another embodiment, a heat transfer method includes cooling a stream which has a dewpoint greater than the ambient air with a plate fin and tube or finned tube exchanger to condense a portion of that stream, then reheating that stream to a higher temperature to eliminate or reduce a visible emission plume.

In one or more of the embodiments described herein, the tube working fluids are the same or of different composition.

In another embodiment, a heat transfer system includes a plurality of working fluid streams on the finned exterior side of a plate fin and tube or finned tube exchanger where the working fluids are of the same or of different compositions.

In yet another embodiment, a heat transfer system includes multiple heat recovery stages to provide additional heat recovery.

A method of operating an energy recovery system for exhaust heat recovery by providing an integrated tube side heating circuitry to heat multiple working fluid circuits while cooling the exhaust stream to condense a portion of the exhaust stream, then heating the exhaust stream to eliminate or reduce visible plume. This is proposed to be accomplished by contacting the exhaust energy stream to be recovered thereafter with the heated working fluid(s), wherein the heated working fluid(s) provides the driving means for energy recovery and selecting a working fluid composition that permits meeting all design constraints.

In another embodiment, the second working fluid contains more than 5% by weight of any of the following: water, ethylene glycol, propylene glycol, sodium formate, potassium formate, sodium chloride, or potassium chloride.

In yet another embodiment, heat transfer exchangers and separators are combined into a single apparatus.

We claim:

1. A method of recovering energy using a finned heat exchanger, comprising:
   providing a first working fluid and feeding the first working fluid to an exterior side of the finned heat exchanger;
   providing a second working fluid through a first passageway in the heat exchanger;
   transferring energy from the first working fluid to the second working fluid;
   providing a third working fluid through a second passageway in the heat exchanger;
   transferring energy from the first working fluid to the third working fluid, wherein at least a portion of the first working fluid condenses to a liquid;
   routing the second working fluid from the first passageway to a third passageway;
   transferring energy from the second working fluid in the third passageway to the first working fluid after the first working fluid has exchanged energy with the third working fluid, wherein the first working fluid is heated to a temperature above its dew point.

2. The method of claim 1, further comprising discharging the first working fluid after it is heated to the temperature above the dew point.

3. The method of claim 2, wherein heating the first working fluid above the dew point reduces visible plume being discharged to atmosphere.

4. The method of claim 1, further comprising separating the liquid from the first working fluid.

5. The method of claim 1, wherein transferring energy from the first working fluid to the second working fluid in the first passageway comprises reducing a temperature of the first working fluid.

6. The method of claim 5, wherein transferring energy from the first working fluid to the third working fluid occurs after the first working fluid exchanges energy with the second working fluid.

7. The method of claim 6, wherein the temperature of the first working fluid is lowered after transferring energy to the third working fluid.

8. The method of claim 7, further comprising separating the liquid from the first working fluid.

9. The method of claim 8, further comprising discharging the first working fluid after it is heated to the temperature above the dew point.

10. The method of claim 1, wherein transferring energy from the first working fluid to the third working fluid comprises reducing a temperature of the first working fluid.

11. The method of claim 1, wherein the second and third working fluids are of the same composition.

12. The method of claim 1, wherein the second and third working fluids are of different composition.

13. The method of claim 1, wherein the second working fluid contains more than 5% by weight of a material selected from the group consisting of water, ethylene glycol, propylene glycol, sodium formate, potassium formate, sodium chloride, and potassium chloride.

* * * * *